Oct. 9, 1962 W. S. HACKETT 3,057,182
MOLD TEST APPARATUS
Filed July 7, 1958 2 Sheets-Sheet 1

INVENTOR.
William S. Hackett
BY
*G. M. Shampo*
ATTORNEY

Oct. 9, 1962 W. S. HACKETT 3,057,182
MOLD TEST APPARATUS
Filed July 7, 1958 2 Sheets-Sheet 2

INVENTOR.
William S. Hackett
BY
G. N. Shampo
ATTORNEY

United States Patent Office 3,057,182
Patented Oct. 9, 1962

3,057,182
MOLD TEST APPARATUS
William S. Hackett, Saginaw, Mich., assignor to General Motors Corporation, Detroit, Mich., a corporation of Delaware
Filed July 7, 1958, Ser. No. 747,059
5 Claims. (Cl. 73—15.6)

This invention relates to foundry apparatus and techniques, and more particularly to apparatus which can be used for testing the hot tensile strength of shell molding compositions.

One of the primary objects of this invention is to provide apparatus for testing the tensile strength of shell molding compositions in such a manner as to give a precise representation of the characteristics at elevated temperatures of a shell mold formed therefrom. This invention further provides an apparatus for rapidly and easily testing the tensile strength of shell molding compositions at elevated temperatures.

Essentially, the shell molding process consists of using a thermosetting plastic or resin as a binder for the sand grains to form rigid molds having high gas permeability, good surface smoothness and dimensional stability. The molding material is generally a dry mixture of a major proportion of silica sand with about 1% to about 15%, by weight, of a plastic binder. Phenol, urea and melamine formaldehyde resins are typical examples of the type of thermosetting binders preferably used. The sand employed is preferably free of metal oxides, clay, moisture and organic matter.

These sand resin molds are prepared by allowing the dry mixture of sand and resin powder to come into contact with a hot metal pattern for a short period of time. A layer of the mix adheres to the metal surfaces due to the heating of the resin which entraps the sand with which it is intimately mixed, thereby accurately reproducing pattern details. Pattern temperatures in the range between 250° F. and 350° F. are typical, but temperatures up to 500° F. may be advantageously employed under particular conditions. The pattern temperatures and the length of time the molding material is allowed to remain in contact with the hot pattern surfaces determine the resulting thickness of the mold. Mold build-up times ranging from a few seconds to approximately one minute are appropriate for various applications.

After this short time interval, the excess dry sand and resin are removed, and the closely adhering sand resin layer is preferably cured by heating to a temperature within the range of approximately 300° F. to 600° F. for a short period of time, usually from a few seconds to five minutes while in contact with the metal pattern.

The baking operation results in the conversion of the resinous material to a hard insoluble binder which securely bonds the sand grains together. The formed molds are, in effect, thin shells which have sufficient strength and stiffness to make them suitable for many casting operations. After the removal of the pattern and mold from the curing oven, the mold is stripped from the pattern.

Since the shell molds which are formed have extremely thin walls it is important that these walls have an exceptionally high strength. These shell molds are used under casting conditions which include relatively high temperatures. Accordingly, it is necessary that the shell mold have this exceptionally high strength at elevated temperatures. The strength of shell molds conventionally are tested at lower temperatures, such as room temperature. However, I have found that frequently the strength of a shell mold at elevated temperatures differs from its strength at room temperatures. Correspondingly, I have found that tensile strength tests of a shell mold at room temperatures are frequently not representative of the strength of the mold elevated temperatures. My invention, therefore, provides apparatus for testing the tensile strength of shell molds at elevated temperatures to more accurately predict performance of a shell mold under casting conditions.

By means of this invention it is now possible to more accurately predict the performance of a shell mold under casting conditions. This invention comprehends forming a tensile strength test specimen of suitable configuration in an aperture in a transversely severed specimen retainer plate in which the test specimen forms a connection between two halves of the retainer plate. The specimen retainer plate is movably disposed in a track between two heating plates which cure the shell molding mix and permit its tensile strength to be tested at an elevated temperature. One end of the retainer plate is connected to a tensile test indicator which measures the strength of a drawing force. The opposite end of the retainer plate is connected to a drive screw assembly which functions as a means of drawing the retainer plate against the tensile test indicator.

By making a sample shell mold in this manner, it is formed in situ in the testing apparatus. By "mold" I speak generically of molds and cores. No separate forming, curing and handling apparatus is necessary. Moreover, the apparatus can be used to test the tensile strength of a shell mold during any part of its curing period and, more particularly, precisely at the time it is cured.

Further objects, features and advantages of the present invention will become more apparent from the following description of a preferred embodiment thereof and from the drawings, in which.

This invention contemplates forming a core, curing it, and testing its strength while it is still in the core box. The specimen retainer plate in my apparatus comprises a core box which permits forming and curing the core and testing its tensile strength while it is still in the core box.

Figures 1, 2:
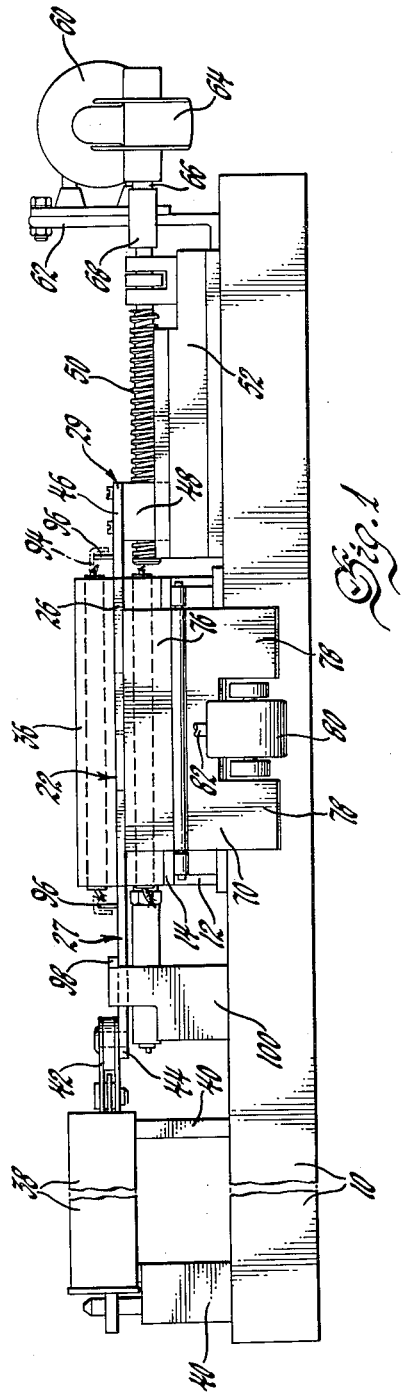
FIGURE 1 shows an elevational side view of the tensile strength testing apparatus of my invention.
FIGURE 2 shows a similar top view of the apparatus shown in FIGURE 1.
Figure 3:
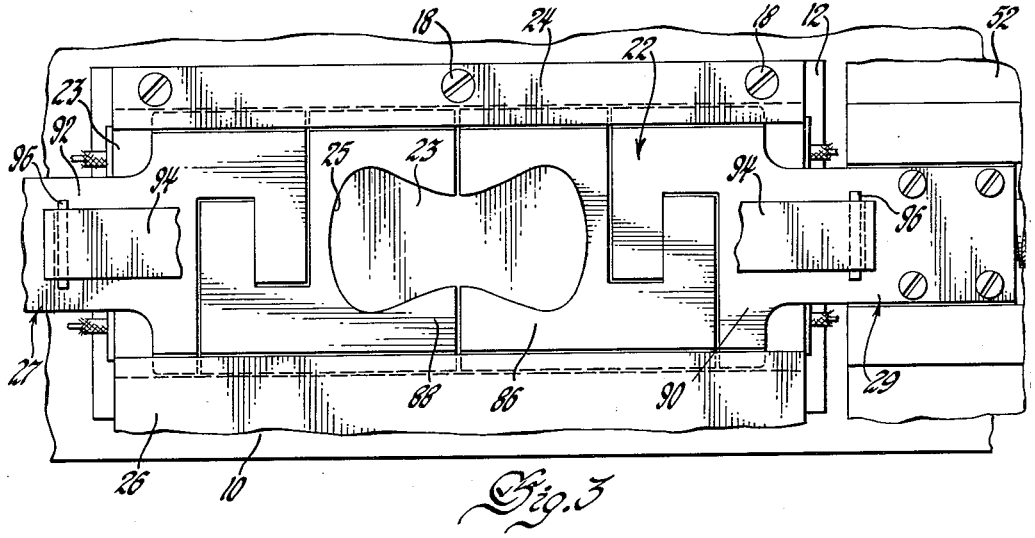
FIGURE 3 shows an enlarged fragmentary top view in elevation of the specimen retainer plate portion of the apparatus shown in FIGURE 2.

Referring now to the drawings, FIGURES 1 and 2 show an apparatus which is adapted for accurately but quickly and easily testing the tensile strength of shell molding mixes at elevated temperatures. A channel base member 10 forms the support for the entire apparatus. A heating plate support 12 is positioned on about the center of the base member 10 to hold a heating plate 14. The heating plate 14, having longitudinal passages 16 therein, is positioned on the heating plate support 12 and secured thereby by means of bolt members 18 or the like. Suitable thermostatically controlled resistance heaters 20, attached to a source of current (not shown) are disposed within the longitudinal passages 16 to provide means for raising the temperature of the heating plate 14. The heating plate 14 is preferably made of a highly heat-conductive material, such as brass or the like, to facilitate uniform distribution of heat from the heating elements 20 throughout the heating plate.

A specimen retainer plate 22, lying on the upper surface 23 of the heating plate 14, is movably disposed between two longitudinally extending hold down members 24 and 26. The specimen retainer plate 22 has an aperture 25 therein which functions as a mold cavity in combination with the upper surface 23 of the lower heating plate 14. The specimen retainer plate is transversely severed in the mold area into two portions 27 and 29 in such a manner that each portion forms part of the aperture 25. The configuration of the aperture 25 is such that a test specimen inserted therein interlocks the two portions 27 and 29 of the retainer plate together.

The hold down members 24 and 26 form a closed track in which the retainer plate 22 longitudinally slides. The edge of each hold down member 24 and 26 adjacent the retainer plate 22 is undercut so as to provide grooves or tracks 28 and 30. Corresponding longitudinally extending transverse projections 32 and 34 on each side of the retainer plate 22 fit into the grooves 28 and 30, respectively, so that the hold down members 24 and 26 lap these extensions. The retainer plate 22 is in turn covered by an upper heating plate 36 which is generally similar in construction to the previously described lower heating plate 14. The retainer plate is longitudinally movable in the track between the two heating plates.

To facilitate positioning of the upper heating plate 36 and thereby simplify operation of the apparatus, the upper and lower heating plates 36 and 14 can be connected by a hinge (not shown), if desired. A handle (not shown) attached to the upper surface of the upper heating plate can also be used to facilitate handling of the upper heating plate when it is hot.

A tensile strength indicator 38 is rigidly affixed to suitable support members 40 on the base member 10 in general longitudinal alignment with the specimen retainer plate 22. The indicator 38 is secured by suitable connecting means 42 to one end 44 of the retainer plate 22. The opposite end 46 of the specimen retainer plate 22 is secured to a drive screw assembly by bolted attachment to a slide nut 48. The slide nut 48 is in threaded engagement with a longitudinally aligned drive screw 50. The drive screw is rotatably mounted on a drive screw retaining block 52 which inhibits substantially any axial movement of the drive screw. Hold down members 54 and 56 similar to members 24 and 26, previously described as forming a track for the retainer plate 22, are permanently secured to the upper surface of the drive screw retaining block 52 by bolt means or the like. A longitudinally extending transverse projection 58 on the lower side of the slide nut 48 adjacent each hold down member 54 and 56 coacts therewith to maintain the slide nut in the track. Rotation of the drive screw thereby causes longitudinal movement of the slide nut in the track.

A reversible electric motor 60 is suitably mounted on a motor support 62 which is secured to the end of the base member 10 adjacent the drive screw assembly. A speed reducer 64 is attached to the motor and the speed reducer is in turn connected to the drive screw 50. The output shaft 66 of the speed reducer 64 is connected to the drive screw 50 by means of a coupling sleeve 68 which is locked in place by cotter pins or the like.

Figure 4:
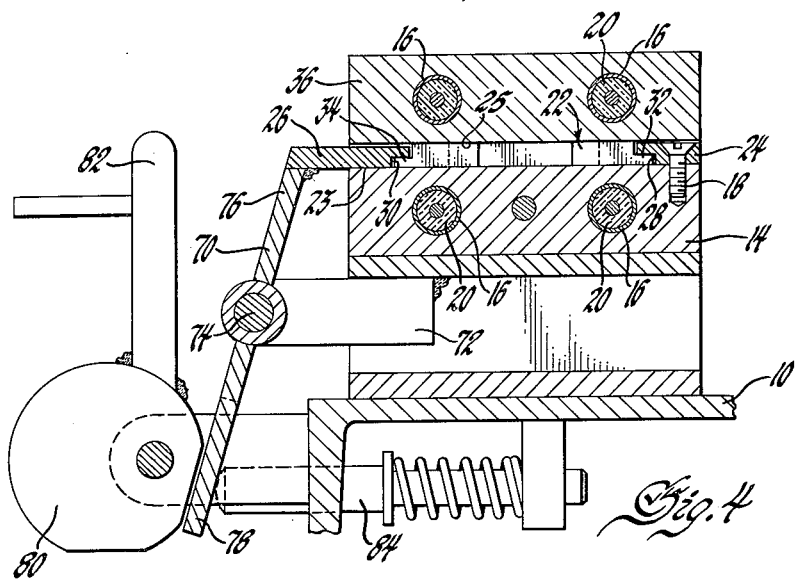
FIGURE 4 shows a transverse sectional view along the line 4—4 of FIGURE 2.
Figure 5:
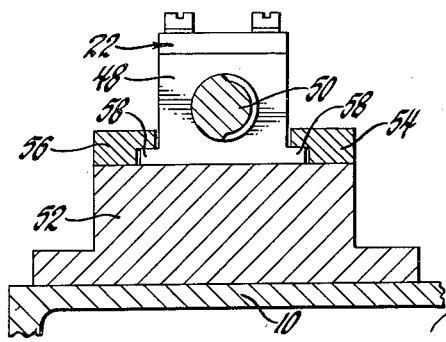
FIGURE 5 shows a transverse sectional view along the line 5—5 of FIGURE 2.

The testing apparatus described herein is used to encompass drawing a suitable specimen against a given force which is provided by a tensile strength indicator. The tensile strength of the specimen is measured by the force required to pull the specimen apart. Each test then involves pulling the test specimen against a given force until the specimen breaks. In order to facilitate removal of used test specimens from the apparatus and prepare the apparatus for a succeeding test, it is especially desirable that the specimen retainer plate be removable. The mold portion of the retainer plate, as well as the upper surface of the lower heating plate, can then be more easily cleaned. As shown more clearly in FIGURE 4, one of the specimen retainer plate hold down members can form part of a movable assembly. The hold down member 26 can be attached to a pivoted plate 70 which moves the hold down member in and out of retaining position over the corresponding edge 34 of the specimen retainer plate 22. A pivot pin support 72 attached to the underside of the heating plate support 12 holds a pivot pin 74 which in turn carries the pivot plate 70. The hold down member 26 secured to the upper end 76 of the pivot plate 70 is positioned for engagement with the specimen retainer plate by pivotal movement of the pivot plate. The lower end 78 of the pivot plate is in contact with a cam 80 in such a manner that rotation of the cam rotates the pivot plate disengaging the hold down from the specimen retainer plate. The cam can be manually operated, as by means of a lever 82. A spring biased plunger pin 84 extending from the base member 10 is in contact with the lower end 78 of the pivot plate opposite the cam to maintain the pivot plate in continuous contact with the cam.

With the hold down member 26 out of engaging position the specimen retainer plate 22 can be moved to facilitate cleaning. We have found it desirable, however, to form each half 27 and 29 of the retainer plate 22 of two interlocking parts. As shown in the drawings, the aperture-forming portions 86 and 88 of each half of the retainer plate are readily movable separate parts which interlock with the end portions 90 and 92 of each half of the retainer plate. With such a construction, the entire aperture or mold section of the retainer plate is readily removable from the apparatus when the hold down member 26 is out of engaging position.

The specific tensile strength indicator which is to be used in the apparatus can be varied considerably. Generally, any suitable indicator which can be adapted to measure a pulling force can be used. There are numerous indicators known in the art and commercially available. Typically, these indicators comprise a housing, a coil spring and a shaft coaxially disposed within the spring. The shaft is of a sufficient length that one end thereof extends through an end wall of the housing. The end of the shaft within the housing is secured to the coil spring in such a manner that the spring is compressed by the shaft as the shaft is withdrawn from the housing. The device is then calibrated to determine the amount of force required to displace the shaft a given amount against the force of the spring.

When the tensile strength indicator is a spring-biased mechanism, such as described above, the portion of the specimen retainer plate attached to the tensile strength indicator is biased to immediately return to its normal position, if displaced. Thus, this part of the retainer plate is biased to return to the normal position during a test when the specimen breaks. Since this return to the null position accompanying the breaking of the test specimen is an immediate forceful response, the apparatus may be deleteriously affected if this action is permitted to run rampant. Accordingly, a generally U-shaped specimen plate expansion limit bar 94 can be used to inhibit immediate return of this half of the retainer plate to its normal position. Upright stops 96 on the upper surface of each half of the specimen retainer plate are used to engage the specimen plate expansion limit bar 94 when the specimen in the retainer plate has broken. The expansion limit bar 94 is constructed so as to permit only a slight amount of expansion of the retainer plate after breakage. In general, we have found that satisfactory results are obtained if the retainer plate is allowed to expand about 3/32 inch before engaging the limit bar. The limit bar can be formed as part of the upper heating plate 36 or it can be a separate U-shaped member, such as shown in FIGURES 1 and 2.

The specimen retainer plate 22 also has a locator stop 98 thereon which extends transversely therefrom to engage an upstanding abutment 100 on the base member 10. The locator stop 98 limits the travel of the retainer plate toward the tensile strength indicator 38. This stop provides a uniform normal positioning of the retainer plate at which the tensile strength indicator can be adjusted to the zero point. Accordingly, the indicator can be quickly returned to the normal position and the tensile strength indicator to a zero reading after each test without the necessity of a precise adjustment each time. Thus, a rapid, accurate and consistent measurement is facilitated.

A description of the operation of the apparatus hereinbefore described will serve to illustrate the method of the instant invention. The reversible drive motor 60 is activated so as to rotate the drive screw 50 and longitudinally move the attached half 29 of the specimen retainer plate 22 into abutment with the adjacent end of the opposite half 27. The shell molding mix to be tested is introduced into the hold cavity 25 formed by the two halves 27 and 29 of the specimen retainer plate and the upper surface 23 of the lower heating plate 14. Sufficient mix is used to completely fill the cavity to the level of the upper surface of the retainer plate. The upper heating plate is subsequently positioned over the retainer plate and the shell molding mix is cured. When the mix has been cured for a sufficient amount of time, the drive means is immediately activated while the specimen is generally still at the curing temperature. The drive screw rotates, thereby pulling the specimen retainer plate against the tensile strength indicator. For increased accuracy and uniformity of results it is preferable to thermostatically maintain the heating plates continuously at the preferred curing temperature. The heating plates are preferably preheated to this temperature before each test.

The temperature at which the heating plates are maintained, of course, can be varied, as well as the duration of the cure. In some instances it may be desirable to vary the cure temperature and duration for each mix used to generally approach actual shell forming conditions. Generally, however, for rapid testing the cure temperature and duration can be suitably fixed to insure a full cure for all samples tested. Then by comparative test results of specimens cured under similar conditions, one can obtain a satisfactory representation of the tensile strength of the test specimen. We have found, for example, that satisfactory results are obtained when comparatively testing samples cured at 400° F. for about 90 seconds.

When the test specimen breaks the motor is stopped and the reading of the tensile strength indicator noted. The test can be run with the upper heating plate 36 still in heating position over the specimen. A limit switch can be used to automatically stop the motor when the retainer plate expands upon breakage of the test specimen.

The drive means should slowly rotate the drive screw so as to provide a slow and even drawing of the retainer plate against the tensile strength indicator, thereby providing a more uniform action which promotes a high degree of accuracy in determining the tensile strength of the specimen. Although the test can be run with the upper heating plate in covering position, it is preferably removed just prior to the drawing step. A separate expansion limit bar is then used and is positioned as hereinbefore described. The expansion step is then immediately carried out before the test specimen substantially cools. The breakage of the test specimen can then be visually noted whereupon the motor is stopped and the tensile strength indicator reading taken.

After the drawing step, the cam 80 operating on the pivoted hold down assembly is then rotated, moving the movable hold down 26 out of locking position. The center portions 86 and 88 of the specimen retainer plate can then be removed from the apparatus, whereupon the retainer plate and the upper surface of the lower heating plate can be cleaned to prepare them for a succeeding test. After the apparatus is cleaned the retainer plate parts are reinserted into position, and the movable hold down is rotated into engaging position. The drive means is then reversed to return the specimen retainer plate to normal position and the apparatus is ready for another test.

Although this invention has been described in connection with certain specific examples thereof, no limitation is intended thereby except as defined in the appended claims.

I claim:

1. An apparatus for testing the tensile strength of a shell molding composition comprising a specimen retainer plate having a suitably contoured aperture therein for containing a tensile test specimen, said retainer plate being transversely severed into at least two segments, each of said segments forming part of said aperture, a tensile strength indicator secured to the outer end of one segment of said specimen retainer plate, locating means on said segment of said specimen retainer plate to normally position said retainer plate for a zero reading on said tensile strength indicator, a slide nut secured to the outer end of the other segment of said retainer plate, a rotatably mounted drive screw in threaded engagement with said slide nut, means for rotating said drive screw, a lower heating plate in contact with the lower surface of said specimen retainer plate for heating a specimen in said aperture, an upper heating plate adjacent the upper surface of said specimen retainer plate opposite said lower heating plate, means coacting with said lower heating plate for restraining the movement of said retainer plate to a longitudinal path, part of said restraining means being a pivotally mounted hold down member, and means for limiting the separation of said segments of said retainer plate.

2. The apparatus as described in claim 1 in which each of said segments of said specimen retainer plate is formed of separate interlocking parts which are readily removable from said apparatus.

3. An apparatus for testing the tensile strength of a shell molding composition comprising a specimen retainer plate having a suitably contoured aperture therein for containing a tensile test specimen, said retainer plate being transversely severed into at least two segments, each of said segments forming a part of said aperture, means for measuring the force required to separate said aperture-forming segments, means for locating said retainer plate to normally position it for a zero reading on said measuring means, means for applying a separating force to said retainer plate, said means including a rotatably mounted drive screw in threaded engagement with a slide nut, means for inducing rotation between said drive screw and said slide nut, a lower heating plate in contact with the lower surface of said specimen retainer plate for heating a specimen in said aperture, an upper heating plate adjacent the upper surface of said specimen retainer plate opposite said lower heating plate, means coacting with said lower heating plate for restraining the movement of said retainer plate to a longitudinal path, part of said restraining means being a pivotally mounted hold down member, and means for limiting the separation of said segments of said retainer plate.

4. The apparatus as described in claim 3 in which each of said segments of said specimen retainer plate is formed of separate interlocking parts which are readily removable from said apparatus.

5. An apparatus for testing the tensile strength of a shell molding composition comprising a specimen retainer plate having a suitably contoured aperture therein for containing a tensile test specimen, said retainer plate being transversely severed into at least two segments, each of said segments forming a part of said aperture, means for measuring the force required to separate said aperture-forming segments, means for locating said retainer plate to normally position it for a zero reading on said measuring means, means for applying a separating force to said retainer plate, a lower heating unit adjacent the lower surface of said specimen retainer plate for heating a specimen in said aperture, an upper heating unit adjacent the upper surface of said specimen retainer plate opposite said lower heating unit, means for restraining movement of said retainer plate to a longitudinal path, and means for limiting the separation of said segments of said retainer plate.

References Cited in the file of this patent

UNITED STATES PATENTS

| | | |
|---|---|---|
| 598,205 | McKnight | Feb. 1, 1898 |
| 1,180,506 | Kirschbraun | Apr. 25, 1916 |
| 1,208,748 | Chew | Dec. 19, 1916 |
| 2,491,512 | Moore | Dec. 20, 1949 |

OTHER REFERENCES

Pages 18 and 19 from Manufacturing Processes, a text book by Begeman published by Wiley & Sons in 1948. (Copy available in U.S. Patent Office, Division 36.)

Journal of Applied Physics, article by F. Bueche, vol. 26, No. 9, pages 1133–1139, September 1953.